Inventors:
Kiyo Tomiyasu,
Joseph C. Almasi,
by Paul A. Frank
Their Attorney.

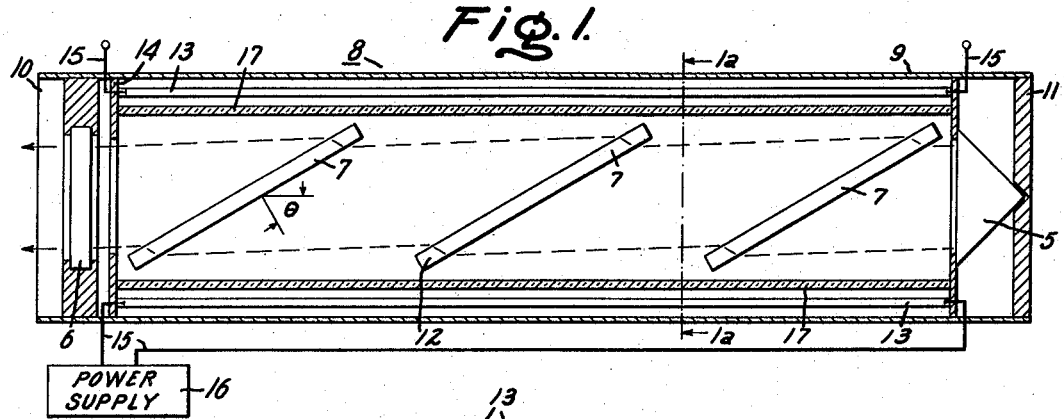
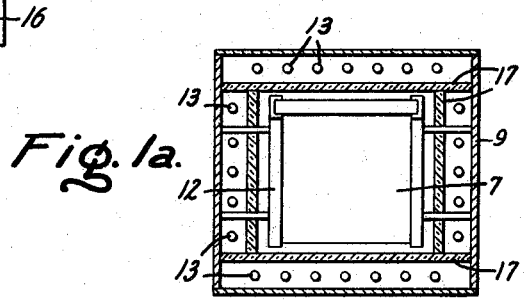
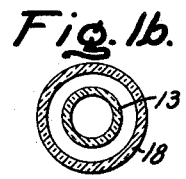
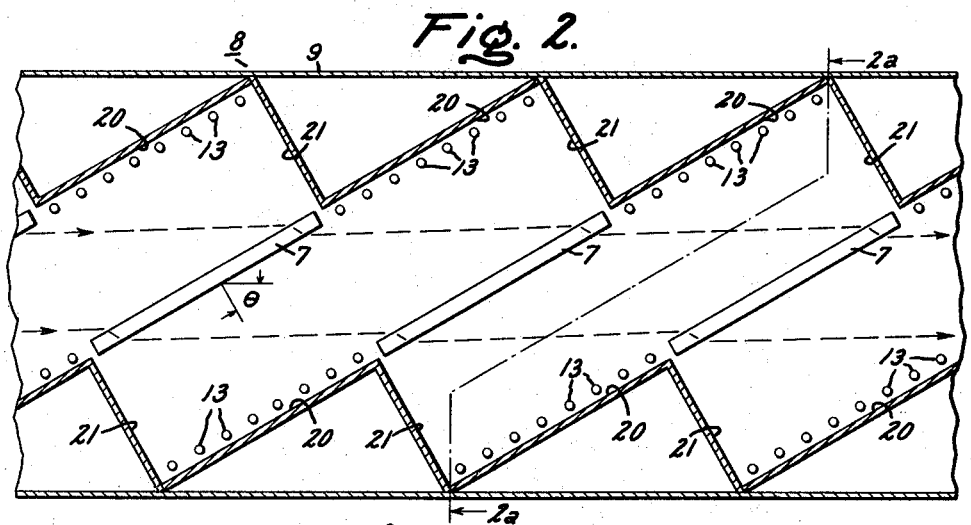
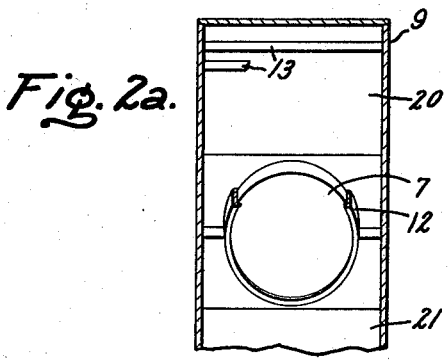
Inventors:
Kiyo Tomiyasu,
Joseph C. Almasi,
by Paul A. Frank
Their Attorney.

United States Patent Office 3,500,231
Patented Mar. 10, 1970

3,500,231
BREWSTER ANGLE ORIENTED END SURFACE PUMPED MULTIPLE DISC LASER DEVICE
Kiyo Tomiyasu, Scotia, and Joseph C. Almasi, Schenectady, N.Y., assignors to General Electric Company, a corporation of New York
Filed June 29, 1965, Ser. No. 467,941
Int. Cl. H01s 3/02, 3/05, 3/09
U.S. Cl. 331—94.5                                  3 Claims

ABSTRACT OF THE DISCLOSURE

A body of solid laser material having a pair of oppositely disposed parallel and relatively large, flat end surfaces and a short longitudinal dimension is supported within a housing having a reflective inner surface with the longitudinal axis of the laser body angularly displaced from the axis of electromagnetic radiation therefrom by the Brewster angle. At least one lamp is supported within the housing for optically pumping the laser body through the end surfaces. A plurality of the laser bodies may be positioned in spaced apart relationship along the longitudinal axis of the housing, each laser body at the Brewster angle, to obtain a series circuit of the laser bodies and a resultant high energy laser beam issuing from the housing upon optical pumping of the both end surfaces of each laser body. The Brewster angle orientation substantially eliminates the air-dielectric interface reflection losses at the laser bodies.

---

Our invention relates to laser apparatus for generating a beam of electromagnetic energy, and in particular, to such apparatus using disk-shaped bodies of laser material which are positioned at the Brewster angle.

A recently developed device, now conventionally described as a laser (light amplification by stimulated emission of radiation), has the potential for wide application in many diverse fields such as communication, metallurgy, and medicine. The laser is a light source having the radiated output therefrom predominantly in one or more narrow bands of the electromagnetic spectrum. Such output is a narrowly diverging beam of light which is usually in the visible or infrared frequency range of the electromagnetic spectrum.

Although specific liquids and gases have been found to exhibit the properties of the laser, the solid laser material in long rod form has provided the highest energy output. The laser rod releases electromagnetic energy which can be stored in discrete metastable states, as a result of being excited or optically pumped by an electromagnetic signal of the correct frequency. Thus, a light or electromagnetic source of the continuous or flash-operating type may be employed to excite or optically pump a laser rod into a metastable high energy state whereupon a stimulated emission of monochromatic and directional (coherent) electromagnetic radiation is emitted from the ends of the laser rod. Typically, the laser rod is optically pumped along the sides thereof and the energy emitted by the laser is directly proportional to the volume of laser material. The effectiveness of the pumping is directly proportional to the surface area available for absorption of the optical pumping energy. From such consideration, it follows that the energy output of such rod is determined primarily by the geometry and size of the rod, the type of laser material, and the amount of optical pumping energy absorbed by the rod. The practical problem of producing large and long pieces of optically perfect laser material, and the mechanical and thermal problems inherent in operating with such large masses of material, present the disadvantage that a limit may be reached beyond which a further increase in laser output is impossible.

More recently, it has been found that a body of solid laser material having relatively large end surfaces which are optically pumped and a short longitudinal dimension can provide high levels of energy output. A problem inherent in all laser devices is the reflection loss occasioned at the air-dielectric interface of the laser body. This loss becomes particularly important in the power amplifier stages of a high energy laser system wherein the amplifier is operable at high energy or power outputs.

Therefore, one of the principal objects of our invention is to develop a laser device having no interface reflection losses.

Another important object of our invention is to eliminate such interface reflection losses by positioning a body of laser material such that the longitudinal axis thereof is at a selected angle with respect to the axis of the laser beam generated thereby.

A still further object of our invention is to provide a serial optically coupled arrangement of bodies of laser material positioned at the selected angle to generate a single and high energy beam of electromagnetic energy in a continuous or pulse operating output as determined by the optical pumping means employed.

Briefly stated, and in accordance with our invention in meeting the objects enumerated above, we provide a laser device which includes a housing having a reflective inner surface and oppositely disposed first and second ends. A body of solid laser material having a pair of oppositely disposed parallel and relatively large, flat end surfaces and a short longitudinal dimension is supported within the housing such that the longitudinal axis of the laser body is angularly displaced from the axis of electromagnetic radiation therefrom by the Brewster angle of the laser material. At least one lamp of the flash or continuous output type is supported within the housing in optical communication with the end surface of the laser body. Upon energization of the lamp(s) the laser body is optically pumped through the end surface(s) thereof and the device may be operated as a laser oscillator or power amplifier stage depending upon whether the laser body is within an optical resonant cavity.

A plurality of the laser bodies may be positioned in spaced apart relationship along the longitudinal axis of the housing, each laser body being disposed at the above-described Brewster angle such that the bodies are optically coupled in series circuit relationship. Energization of a plurality of lamps contained within the housing provides optical pumping of both end surfaces of each laser body and a laser beam may be emitted from one of the open ends of the housing. The laser beam so emitted may have an extremely high energy when the laser bodies are operated in the pulsed mode and the air-dielectric interface reflection losses are completely eliminated due to the Brewster angle orientation of the laser bodies.

The features of our invention which we desire to protect herein are pointed out with particularity in the appended claims. The invention itself, however, both as to its organization and method of operation, together with further objects and advantages there, may best be understood by reference to the following description taken in connection with the accompanying drawings, wherein:

FIGURE 1 is a side view, partly in section, of a laser oscillator constructed in accordance with our invention;

FIGURE 2 is a side view, partly in section, of a second embodiment of our invention;

Figure 3:
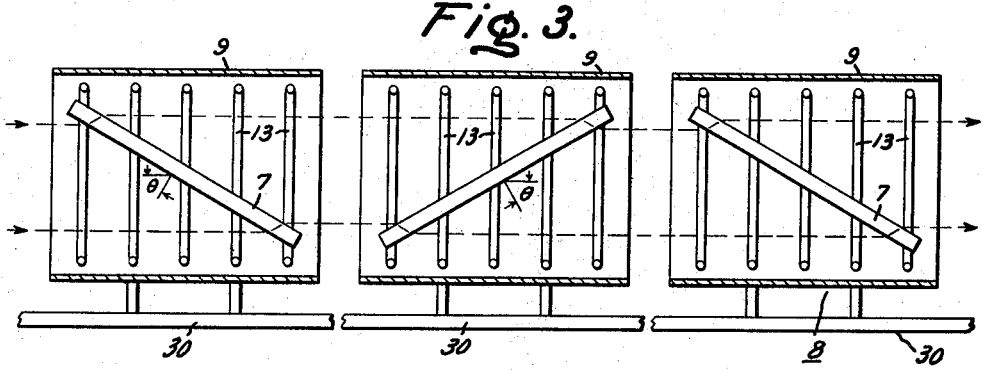
FIGURE 3 is a side view, partly in section, of a third embodiment of our invention.

In laser operation, the stimulated emission of electromagnetic radiation is initiated in the laser material by what is generally described as an initial spontaneous emission of electromagnetic radiation. A suitable optical resonant cavity amplifies such initial spontaneous radiation and generates the hereinbefore described stimulated emission of electromagnetic radiation in the laser material. The output energy of the emitted laser radiation is determined primarily by the geometry and size of the laser material and the optical pumping energy. The directionality of the emitted laser radiation is determined primarily by the geometry of the laser material and the optical resonant cavity. The conventional geometry of laser material comprising the long rod herein-above described, emits the electromagnetic radiation at an output energy determined by the energy density and area of the end surfaces of the laser rod. High outputs of laser energy are obtained by increasing the pumping energy and the length and cross-sectional area of the laser rod. However, the limit is reached beyond which an increase in the size of the present rod-type laser does not generate a proportional increase in laser output energy. The limit is determined by several factors. Firstly, the activated portion of the laser material is determined by the depth to which the pumping energy can penetrate. Thus, in increasing the cross sectional area of the laser rod beyond a particular size, the output of laser energy no longer increases as the volume of laser material but only as the diameter since the laser material within the innermost part of the rod does not become excited into the desired metastable high energy state. Further, the laser beam generated thereby has a somewhat hollow configuration due to the reduced excitation at the center of the rod. Secondly, increasing the length of the laser rod to produce a greater surface in optical communication with the pumping lamp and a larger volume of excited material and thereby generate a higher level of laser energy density, beyond a certain dimension, presents the practical problem of producing long pieces of optically perfect laser material and the mechanical and thermal problems inherent in operating with such configuration. Thirdly, destruction of the laser material occurs when the laser energy density reaches a sufficiently high level. Fourthly, a spontaneous avalanche condition occurs when the gain-length factor of the laser rod exceeds a certain value thereby precluding a high degree of directivity in the beam of laser radiation. Nonuniform temperature within the laser madium during optical pumping, as a function of the laser rod radius, also causes optical path distortion. The nonuniform temperature is caused by nonuniform pump flux penetration into the laser rod.

Utilizing a cylindrical body of laser material having a pair of oppositely disposed parallel and relatively large flat end surfaces and a relatively short longitudinal dimension can obtain extremely high output of laser energy since such disk-shaped laser body is not volume limited as in the case of the long rod-type laser. A laser disk having end surface areas of many square inches is readily manufactured and the much greater volume of laser material therein may be optically pumped through such large end surfaces. The total volume of laser disk material can be activated since the pumping energy readily penetrates the smaller depth (longitudinal dimension) of the laser disk and the output of laser energy thus continues to increase as the volume of laser material increases at the higher energy levels rather than only as the diameter as in the rod-type laser. Also the laser beam generated by the laser disk does not have the undesired hollow configuration which the rod-type laser may have due to unexcited central portions thereof since the entire end surface of the laser disk is always excited to a depth determined by the optical pumping energy. Further the much greater end surface area of the laser disk as compared to the laser rod permits high energy operation at a much lower energy density with the laser disk thereby avoiding the danger of destruction of the laser material which may occur in the rod-type laser. The gain-length factor of the laser disk being small prevents the spontaneous avalanche condition from occurring as in the case of laser rods and thus permits a high degree of directivity in the beam of generated laser radiation. The laser disk geometry relaxes the requirements on laser material homogeneity in that local variations in refractive index can be compensated by further polishing of the deformed surface. Finally temperature distribution and density of the metastable states are considerably more uniform as a function of radius in a disk-type laser as compared to the rod-type laser. Variations in both temperature distribution and density of the metastable states do vary in the longitudinal direction for the laser disk but such variations do not degrade the optical phase front along the diameter of the disk.

As herein employed, "cylindrical" is defined as the surface traced by any straight line moving parallel to a fixed straight line and is limited to a right cylinder, that is, having a pair of oppositely disposed planar end surfaces transverse to the longitudinal dimension of the body. Thus, the cross section of the laser body (taken at right angles to the longitudinal axis) may be circular, elliptical square, rectangular, or any other suitable outline, as desired. The right cylindrical body of laser material having parallel and relatively large flat end surfaces and a relatively short longitudinal dimension will hereinafter be described as a laser disk as distinguished from the long rod-type laser. The terms "relatively large end surfaces" and "relatively short longitudinal dimension" herein employed refer to a body wherein a diameter thereof is at least equal to or greater than the length of the body.

The laser disk, although having the above-described advantages over the long rod-type laser has a disadvantage common to all lasers, an interface reflection loss at the air-dielectric interface of the end surfaces. The interface reflection loss is due to mismatch of the reflective index of the laser material end surface and the air or other atmosphere adjacent thereto, and may be approximately 4% for each laser end surface and thus about 8% for each laser disk. At the higher energy laser outputs wherein a plurality of laser disks are serially coupled, the interface reflection loss becomes in the order of 8% times the number of disks and thus becomes very significant where 4, 5 or more laser disks are serially coupled. It is recognized that the laser material end surfaces may be coated with low reflection coatings to reduce the interface loss, but even such means cannot completely eliminate this loss and in addition, it may introduce scattering losses.

Our invention eliminates interface reflection loss by positioning the laser disk(s) within a laser apparatus such that the longitudinal axis of the laser disk(s) is angularly displaced from the axis of laser beam radiation therefrom by the Brewster angle. The Brewster angle $\theta$ of a dielectric is a function of the refractive index thereof and is defined as that angle of incidence for which a wave polarized parallel to the plane of incidence is wholly transmitted (i.e., no reflection). The Brewster angle is in the range of approximately 57 to 60 degrees, and for any particular laser material the tangent of the Brewster angle is equal to the refractive index of such material.

Referring particularly to FIGURE 1, there is shown a side view, partly in section, of a laser oscillator constructed in accordance with our invention. It is to be understood that the particular configuration of laser disks and optical pumping means may also be used in laser power amplifiers wherein the external optical resonant cavity formed by external reflectors consisting of a totally reflective prism 5, such as a conventional 90° roof or Porro prism, and a partially transmitting plane mirror 6 are omitted. One or more (as illustrated) laser disks 7 are supported within a housing, designated as a whole by numeral 8, which may be made of metal. Housing 8 comprises a hollow member 9 having a diffuse or specular reflective inner surface to increase the efficiency of laser pumping. Housing 8 has an open end 10 and a covered end 11 oppositely disposed from each other, it being understood that in the case of a power amplifier, both ends are open. The particular shape of housing 8 in cross section is determined primarily by the shape of the laser disks 7 that are supported therein at the selected Brewster angle position relative to the direction of the beam of electromagnetic radiation emitted therefrom. Thus, in the case of a rectangularly shaped laser disk as in the case of the FIGURE 1 embodiment, the cross section of the hollow member 9 of housing 8 is preferably square or rectangular as illustrated in the sectional end view of FIGURE 1a wherein the rectangular laser disk is seen as a square member and thereby can transmit a square cross section laser beam. The laster disk 7 may be supported within housing 8 by any suitable means such as bracket member 12 which encloses two or more side surfaces of the laser disk, the remaining side surface being made opaque by a suitable means to prevent undesired side surface optical pumping which would result in nonuniform pumping of the laser disk. The laser disk support means are illustrated only in the end views, and not in the side views, of the four embodiments to be described for purposes of simplicity. It should be noted that the rectangular dimensions of the angularly positioned laser disk(s) need not be such as to necessarily provide a square shaped laser disk as seen in the end view of FIGURE 1a since such requirement is necessary only to obtain a laser beam having a square cross section. Thus, in the case wherein the laser disk has actual dimensions of a square in cross section, the laser beam emitted therefrom in an arrangement such as the apparatus of FIGURE 1 has a rectangular cross section.

An optical pumping means for the laser disk(s) is positioned adjacent the reflective inner surface of the housing and may conveniently comprise at least one lamp 13 (or a plurality of lamps in a planar arrangement) of a type having a radiation output preferably in a narrow and desired spectral range to concentrate such lamp radiation in the particular spectral area required to optically pump the particular laser material. Such lamp may be of the continuous or flash-operating type to obtain respectively a continuous or pulse mode of laser operation. The particular shape of the lamp(s) employed is determined primarily by the geometry of the laser disk 7 and hollow housing member 9. Thus, the lamp(s) 13 in the FIGURE 1 embodiment, wherein housing member 9 is rectangular or square in cross section, may be a long straight lamp extending substantially along the full longitudinal dimension of housing 8, or, in cases of exceptional length may be divided into a plurality of shorter length lamps. Alternatively, shorter straight lamps positioned transversely in housing 8 adjacent the reflective inner surfaces thereof, or, rectangularly shaped lamps positioned in transverse planes of the housing (or four straight lamps arranged to form a square or rectangular outline) may be employed. Although a single long straight lamp along the top and bottom may be employed, a planar arrangement of parallel, and equally spaced apart lamps along the top and bottom inner surfaces of the housing or along all four surfaces as shown in FIGURE 1a are preferably used to increase the amount of optical pumping and also provide more uniform pump flux across the disk end surfaces. In the case of transversely positioned lamps, they are preferably unequally spaced apart to provide more uniform pump flux at the disk end surfaces. It should be noted that the longitudinally positioned lamps provide relatively uniform pumping of the laser material across the beam cross section, any nonuniform pumping at one end surface being complemented by similar nonuniform pumping at the second end surface.

In like manner, the laser disk(s) may be optically pumped through only one end surface thereof by positioning the lamps in particular arrangements, such as in the case of FIGURE 1 along only the top inner surface of housing 8. The preferred method of pumping the laser disk(s), however, is to have both end surfaces in direct optical communication with the pumping lamps to obtain more uniform optical pumping of the laser material and obtain greater optical pumping and thereby increase the level of generated laser energy for which the laser disk is especially suitable. The radiation (laser pumping energy) emitted by the lamps is directed at the end surfaces of the laser disk, both directly and indirectly by reflection from the inner surface of housing member 9. For purposes of illustration, housing member 9 is shown as comprising a single member, however, it may be divided into two or more longitudinal parts as necessitated for the insertion and removal of the lamps and laser disks from the interior thereof.

Lamps 13 are positioned within housing 8 by having their terminal ends suitably supported and electrically insulated from housing 8 by means of support members 14. Electrical conductors 15 which are connected to the electrodes of lamps 13 are electrically insulated from housing member 9 and brought out therethrough and connected to a suitable source of electrical energy 16. In the case of flash lamps, a conventional high voltage electronic trigger circuit (not shown) may be employed to initiate the gaseous discharge within such flash lamps. Since the lamp portion of the housing develops an electromagnetic radiation of relatively high intensity over a wide range of wavelengths, a suitable selective radiation filter 17 may be provided for isolating the lamp from the laser disk to filter out the spectrum of the lamp radiation which is not useful for pumping the laser disk and thereby reduce the heating of the laser disk. As illustrated in FIGURES 1 and 1a, radiation filter 17 comprises a flat surfaced member supported from support members 14 and extending across the width of the housing as indicated in FIGURE 1a. Alternatively, or in addition, cooling means such as forced air or liquid coolants may be employed, the cooling means being most effective when applied to the lamps and as one example, may comprise a suitable water jacket as illustrated in FIGURE 1b wherein the inner wall thereof comprises the outer fused silica of lamp 13. The water jacket may provide the combined selective radiation filter effect and cooling effect by having the outer wall 18 of the water jacket fabricated from a material such as Pyrex which filters out the ultraviolet radiation. For the sake of simplicity, radiation filters and cooling means will not be hereinafter described or shown, although it is to be understood that they may be used, if desired. Controlled atmospheres may also be provided within housing 8 to minimize absorption by such atmosphere of the intense pump and laser output radiation. Such atmosphere may be provided solely in the disk portion or the lamp portion of housing 8 or may completely fill the housing, suitable gas isolating means being required to maintain such atmosphere. This atmosphere should be a homogeneous media to provide a constant index of refraction. The atmosphere may be of any of a number of suitable gases such as nitrogen. A vacuum may also be employed in the disk portion, lamp portion, entire housing, or entire optical resonant cavity, cooling means being provided in the lamp portion of the housing. Evacuation of the optical resonant cavity and containing a flash lamp appropriately cooled in an evacuated envelope eliminates two sources of distortion of a laser beam due to the flash lamps, namely, a sonic wave generated by the flash lamp striking the laser body and producing vibrations and stress-optical distortion, and, the intense optical radiation from the flash lamp heating the air within the cavity and producing optical distortion. The water jacket also reduces the effect of the sonic wave.

Lamp(s) 13 is in direct optical communication with an end surface(s) of laser disk(s) 7 and in combination with the reflective inner surface of housing 8 provides an intense light source. Such intense light source optically pumps the laser disk angularly positioned at the Brewster angle $\theta$ with respect to the direction of laser beam radiation therefrom, through the end surface thereof into a metastable high energy state characteristic of the laser material employed. The laser disk when contained within an optical resonant cavity as in FIGURE 1, or subjct to an incident laser beam having a component of polarization parallel to the plane of incidence as in FIGURE 3 thence releases such high energy in the form of a narrowly diverging beam of electromagnetic radiation emitted from the end surfaces and directed along the Brewster angle direction.

The combination of a single laser disk, one or more lamps associated therewith, and a housing forms what may be defined as a laser module. The laser module can be optically couple in series circuit relationship with one or more laser modules of the same type, or, alternatively, the plurality of laser modules may be combined within one housing as shown in FIGURE 1 to reduce problems of alignment and permit a more economical and practical structure. Thus, the later oscillator illustrated in FIGURE 1 may include only one or any number of laser disks optically coupled in series circuit relationship, the number employed depending upon the laser energy level output desird. A specific example of a laser module comprises the following elements. Laser disk 7 is of neodymium glass, the composition of such laser material comprising a 3% neodymium doped silicate glass. The end surfaces of the laser disk are flat and polished, while the side surfaces are the unpolished. The end surfaces are not necessarily optically flat, the criterion being that the optical transmission through the laser material be uniform. Xenon flash lamps 13 are employed for laser operation on a pulsed output basis and arc lamps for continuous output. The inner surface of housing member 9 is polished aluminum. External reflectors 5 and 6 in the case of a laser oscillator define an optical resonant cavity and are the only elements requiring critical alignment. The interposed laser disk(s) being a flat plate cannot distort the plane standing wave pattern in the cavity if misaligned from the Brewster angle. The Porro prism 5 directs the collimated laser beam toward the plane mirror end of the housing and the laser beam passes from the latter end outwardly as indicated by arrows. It is to be noted that the laser beam is not parallel to the longitudinal axis of the housing due to beam refraction at each laser disk causing a small lateral displacement of the beam. The laser beam generated by the neodymium disk and emitted through housing end 10 is a highly collimated an coherent electromagnetic radiation having a wave length of 1.06 microns which is in the infrared spectrum. The large area of the end surfaces provided by the disk-shaped laser, in addition to providing an efficient pumping geometry, permits the generation of a high output of laser energy while maintaining the energy or power density within the laser material below its destructive level. The laser module and plurality of serially-optically coupled lasers hereinabove described can be combined into system components such as a high energy laser oscillator illustrated in FIGURE 1 or power amplifier.

FIGURE 2 illustrates a side view, partly in section, of a plurality of serially optically-coupled laser disks each positioned at the Brewster angle $\theta$ as defined for the laser disks of FIGURE 1. The laser disks are shown although any number, including only one, may be so arranged with external optical reflectors (not shown) as in the case of the FIGURE 1 embodiment to produce a high energy laser oscillator, or, provided without such optical resonant cavity defining means to produce a high energy laser power amplifier of the single-pass type wherein an incident laser beam enters the FIGURE 2 apparatus at one end (right or left), is amplifier, and exits at the other end as seen by the arrows which define the extremities of the laser beam. In the power amplifier application, the incident laser beam is generated by another device such as a laser oscillator. The particular laser disks 7 illustrated in the FIGURE 2 embodiment of our invention are of elliptical shape in cross section such that in an end view of the housing as shown in the partly broken away sectional end view of FIGURE 2a, the laser disk appears to be circular in cross section and thereby can transmit a circular, cross section laser beam. Other laser disk shapes such as circular, rectangular or square can also be employed. Housing 8 is of rectangular shape in cross section in the illustrations of FIGURES 2 and 2a although it should be understood that a circular or elliptical form may also be employed which is determined primarily by the shape of the laser disk and lamps employed. The optical pumping means for each laser disk may be a single or plurality of straight or circular-shaped lamps, and, as in the case of the FIGURE 1 embodiment, one or both end surfaces of the laser disk may be optically pumped as desired. In the case of straight lamps, they may be positioned transversely, as shown, or in a perpendicular direction thereto along the inner surface 20. The plurality of lamps are in a planar arrangement of equally spaced apart parallel lamps to obtain a substantially uniform pump flux pattern. The primary distinction between the laser apparatus illustrated in FIGURES 1 and 2 is the disposition of the lamps 13. In FIGURE 2, lamps 13 are mounted adjacent a reflective inner surface 20 which is disposed substantially parallel to the end surfaces of laser disk 7 to thereby obtain a more uniform pumping across each laser disk end surface as distinguished from the pumping obtained with the longitudinally positioned lamps in FIGURE 1. The inner surface of hollow housing member 9 includes reflective inner surface 20 and a second reflective inner surface 21 substantially perpendicularly disposed with relation to surface 20. Surface 21 prevents the lamps 13 associated with a particular laser disk 7 from optically pumping an adjacent laser disk and also reflects the pump radiation toward the end surface of the associated laser disk for improved pumping efficiency. Inner surfaces 20 and 21 are illustrated as being flat but they can be curved to conform to laser disks such as the elliptically shaped one of FIGURE 2, if desired. In such latter case, the lamps would not be in a planar array but would be preferably arranged to conform to the curved surface. Laser support bracket member 12 is illustrated as partly broken away in FIGURE 2a, but, as in the case of any of the laser support bracket members herein disclosed, it may extend completely around the side surfaces of the disk or merely along only a portion thereof and the remaining portion of the laser disk side surface suitably isolated from the radiation of lamps 13 as by coating with an opaque paint. As an example of another construction of inner surface members 20 and 21, the two inner surfaces 20 of FIGURE 2 associated with each particular laser disk may be substituted by a tubular reflective member of round or elliptical cross section while the two surfaces 21 associated with adjacent laser disks may be in the form of a thin plate having a center aperture through which the laser beam passes. Another advantage of the FIGURE 2 embodiment compared to FIGURE 1 is that the decreased volume within housing 8 increases the optical pumping efficiency.

Figure 3A:
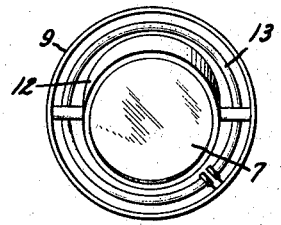

Referring now to FIGURE 3, there is shown an arrangement of laser disks 7 within housing 8 which is different from that illustrated in FIGURES 1 and 2 in that the laser disks are not successively parallel but only alternately parallel, the laser disks, however, still being positioned within the housing at the indicated Brewster angle $\theta$ and the laser beam being capable of emission from either end of the housing. In the FIGURE 3 embodiment, laser disks having elliptical cross sections as in the case of the FIGURE 2 laser disks are employed for illustrative purposes only. Hollow housing member 9 has a circular cross section and is provided with a support means 30. Circular lamps 13 are supported adjacent the reflective inner surface of hollow housing member 9 to provide optical pumping to both end surfaces of each laser disk. The inner reflective surface of housing member 9 may obviously also be constructed of angularly disposed members positioned substantially parallel to the end surfaces of the laser disks to thereby obtain the more uniform pumping as obtained in FIGURE 2. FIGURE 3a is an end view of FIGURE 3.

Figure 4:
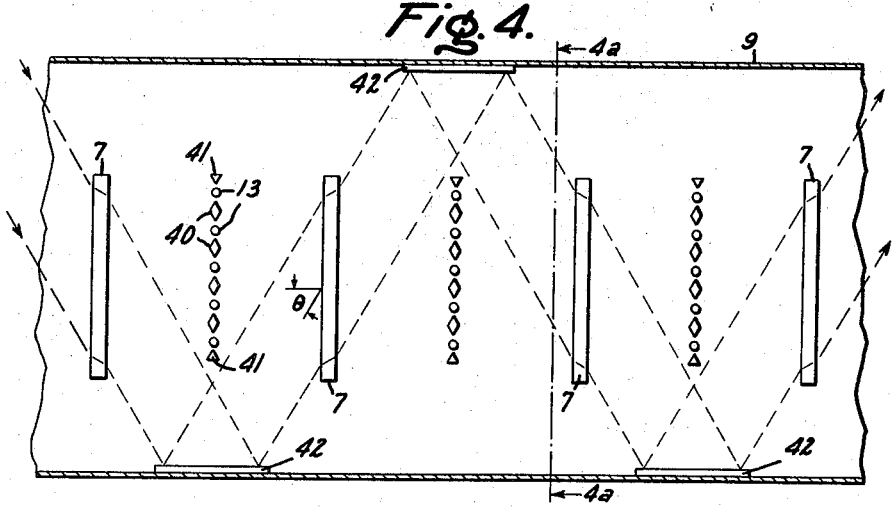
FIGURE 4 is a side view, partly in section, of a fourth embodiment of our invention.
Figure 4A:
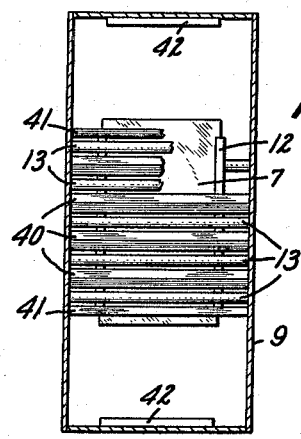

A fourth embodiment of our invention is illustrated in FIGURE 4 wherein the laser disks 7 have their longitudinal axes aligned with the longitudinal axis of housing member 9. The incident laser beam thus impinges upon a first end surface of one outermost laser disk and exits from the housing from the second end surface of the other outermost laser disk in the Brewster angle direction as indicated by the arrows. Rectangularly shaped laser disks 7 and rectangularly shaped housing member 9 in cross section are illustrated in FIGURES 4 and partly broken away sectional end view 4a, the rectangular disk permitting a square cross section laser beam to be transmitted. The laser disks are optically pumped by planar arrays each comprising a plurality of parallel positioned equally spaced apart straight lamps 13. The lamps are supported within housing member 9 and in this particular embodiment are not positioned adjacent the reflective inner surface thereof but rather are disposed in a planar arrangement parallel to the end surfaces of the laser disks and approximately midway between adjacent laser disks. Adjacent lamps in each planar array are separated by means of reflector members 40 which have substantially square cross sections and are oriented for directing the lamps' radiation toward particular areas of the end surfaces of two adjcent laser disks. In the case of flash lamps, they may be sufficiently energized by providing electrical energy of sufficiently high voltage across their terminals, however, it is preferable to employ an external electronic trigger to initiate the gaseous discharge within the flash lamps. In such case, reflectors 40 may serve the dual purpose of directing the radiation of output from the lamps toward particular areas of the laser disk end surface and also function as trigger electrodes for initiating such gas discharge. In the latter case, the reflector members each comprise an intermediate section of highly polished electrically conductive material such as aluminum and terminal ends of electrically insulating material, a relatively high voltage energizing circuit (not shown) being connected to a conductive wire which passes through the first insulated ends of the reflective trigger electrodes. The two outermost lamps in each array are preferably each provided with a second reflector member 41 disposed at opposite edges of the lamp array to further aid in directing the outer lamps' radiant output toward the adjacent laser disks' end surface. In the case of a continuously operating laser, reflector members 40, in general, function merely as light reflecting members. Although the laser apparatus is operable without reflector members 40 and 41, their use permits a more efficient optical pumping of the laser disk and also shields the lamps from direct radiation by adjacent lamps thereby prolonging lamp life. Reflector members 40 and 41 of the same or different forms as illustrated in FIGURES 4 and 4a may also be employed in the three prior described embodiments. The laser beam when passing through a housing member 9 having two or more serially optically coupled laser disks 7 is reflected from an inner surface of the housing approximately midway between adjacent laser disks. An extremely flat optical quality mirror 42 is preferably positioned at the inner surface of housing member 9 at each area of laser beam reflection to thereby obtain a high efficiency of transmission of the laser energy to the adjacent laser disk. The housing, laser disks and lamps illustrated in FIGURES 4 and 4a may also be elliptical or circular in cross section as described with relation to the other embodiments.

From the foregoing description, it is apparent that our invention attains the objectives set forth and makes available an improved laser apparatus which completely eliminates interface reflection losses by positioning the body of laser material such that its longitudinal axis is at the Brewster angle with respect to the direction of laser radiation therefrom. The Brewster angle orientation of the body of laser material is especially well adapted for laser material having a disk shape comprising two opposed and parallel large end surfaces and a short longitudinal dimension. One or more of the laser disks may be optionally coupled in series circuit relationship to provide a high energy laser oscillator (when using an optical resonant cavity) or power amplifier. The laser disks may be arranged in successive parallel relationship or alternate parallel relationship and the optical pumping means may be positioned in a number of arrays to pump one or both end surfaces of each laser disk. The disk laser permits generation of a high energy beam of electromagnetic radiation especially when operable in the pulsed mode. Since the energy output of a laser device is directly proportional to the volume of laser material, and a disk-shaped laser having an end surface area of many square inches may readily be manufactured, it is apparent that a much greater volume of laser material may be optically pumped and thereby provide an extremely high level of laser energy in the form of a narrowly diverging beam of electromagnetic radiation. The laser disk is not volume limited as in the case of the long rod-type laser.

Having described four embodiments of an improved laser device, it is believed obvious that modification and variation of our invention is possible in the light of the above teachings. Thus, the particular shape of the housing, laser disk, lamp and orientation of lamps disclosed in any of tthe four embodiments may readily be employed in the other embodiments. Also, cooling means for the lamps, controlled atmospheres, selective radiation filters (separate or integral with the lamp glass envelope) and reflector members for the lamps may be employed singly or in combination. For continuous laser operation, cooling of both the disk and the lamps is necessary. The laser beam divergence can be further controlled by interposing optical mode selectors between adjacent lasers within the housing or between separate laser modules. For maximum laser energy applications for a particular laser disk size, an increasingly greater number of laser disks may be serially arranged in optical communication to increase the level of the generated laser energy to a point just before damage to the laser disks may occur. Finally, our invention is not limited to neodymium as the laser material but is intended to cover other solid laser materials in disk form such as the well known ruby, for example. Our invention also includes the combination of both end surface and side surface pumping as in the case of a relatively closely spaced multiple disk laser having overlap of adjacent disks. This combination of surfaces pumping increases the optical pumping efficiency, but at the expense of laser beam quality. It is, therefore, to be understood that changes may be made in the particular embodiments of our invention described which are within the full intended scope of the invention as defined by the following claims.

What we claim as new and desire to secure by Letters Patent of the United States is:

1. A laser apparatus comprising
   a housing having a reflective inner surface,
   a plurality of serially optically coupled bodies of laser material positioned within said body, each body of laser material having a pair of relatively large and parallel planar end surfaces and a relatively short longitudinal dimension, said bodies of laser material positioned in spaced apart and alternately parallel relationship along the longitudinal axis of said housing, the longitudinal axis of each said body of laser material angularly displaced from the axis of electromagnetic radiation therefrom by the Brewster angle, and a plurality of circular lamps supported within said housing and positioned adjacent the inner surface of said housing, said lamps disposed in spaced apart and parallel planes each normal to the longitudinal axis of said housing, said lamps positioned in encircling relationship relative to the bodies of laser material to obtain optical communication with the pair of end surfaces of said bodies of laser material for optically pumping the end surfaces upon energization of said lamps.

2. A laser apparatus comprising
a housing having a reflective inner surface,
a plurality of serially optically coupled bodies of laser material positioned within said housing, each body of laser material having a pair of relatively large and parallel planar end surfaces and a relatively short longitudinal dimension, said bodies of laser material positioned in spaced apart and parallel relationship along the longitudinal axis of said housing, the longitudinal axis of each said body of laser material aligned with the longitudinal axis of said housing and angularly displaced from the axis of electromagnetic radiation therefrom by the Brewster angle,
a plurality of lamps supported within said housing and positioned in planar arrays midway between adjacent bodies of laser material and parallel to the end surfaces thereof whereby said lamps are in optical communication with at least one end surface of the bodies of laser material for optically pumping the end surfaces upon energization of said lamps, and a plurality of mirrors positioned at the reflective inner surfaces of said housing corresponding to the areas from which the electromagnetic radiation emitted from the bodies of laser material is reflected for increasing the efficiency of transmission of the radiation to the adjacent body of laser material.

3. The laser apparatus set forth in claim 2 wherein said mirrors are each disposed approximately midway between adjacent bodies of laser material.

References Cited

UNITED STATES PATENTS

| | | | |
|---|---|---|---|
| 3,390,351 | 6/1968 | Bell | 331—94.5 |
| 3,423,693 | 1/1969 | Chernoch et al. | 331—94.5 |
| 3,311,846 | 3/1967 | Simpson et al. | 331—94.5 |
| 3,354,404 | 11/1967 | Boyle et al. | 331—94.5 |
| 3,356,966 | 12/1967 | Miller | 331—94.5 |

RONALD L. WIBERT, Primary Examiner

U.S. Cl. X.R.

330—4.3